United States Patent [19]

Hartmann

[11] Patent Number: 5,252,350

[45] Date of Patent: Oct. 12, 1993

[54] PROCESS FOR CLARIFYING LIQUIDS, PARTICULARLY RAW JUICE

[75] Inventor: Eduard Hartmann, Schneisingen, Switzerland

[73] Assignee: Bucher - Guyer AG Maschinenfabrik, Niederweningen, Switzerland

[21] Appl. No.: 372,376

[22] PCT Filed: Sep. 30, 1988

[86] PCT No.: PCT/CH88/00177

§ 371 Date: Jun. 2, 1989

§ 102(e) Date: Jun. 2, 1989

[87] PCT Pub. No.: WO89/02708

PCT Pub. Date: Apr. 6, 1989

[30] Foreign Application Priority Data

Oct. 2, 1987 [CH] Switzerland .................... 3852/87

[51] Int. Cl.$^5$ ................................................ A23L 2/30
[52] U.S. Cl. .................................. 426/490; 426/492; 210/321.65

[58] Field of Search ............... 426/51, 490, 492; 210/90, 96.2, 637, 651, 321.65

[56] References Cited

U.S. PATENT DOCUMENTS 3,756,408  9/1973  Spatz et al. .................... 210/96.2

*Primary Examiner*—Helen F. Pratt
*Attorney, Agent, or Firm*—Edmund M. Jaskiewicz

[57] ABSTRACT

A process for clarifying raw juice in which the proportion of solids in the retentate circuit (2, 3, 4) of an ultrafiltration or microfiltration device (1) is sharply increased during the starting time (FIG. 1). With increasing proportion of solids, the filtration yield falls off sharply and then increases again to a value which is higher than the starting value. On reaching the maximum possible filtration yield value, the proportion of solids and thereby also the filtration yield is maintained constant by regulating the amount of retentate outflow or the amount of fresh juice to be fed in. In this way the filtration yield can be significantly improved.

5 Claims, 3 Drawing Sheets

PROCESS FOR CLARIFYING LIQUIDS, PARTICULARLY RAW JUICE

The invention relates to a process for clarifying liquids, particularly raw juice from fruit, grapes, berries or other fruits and vegetables by ultrafiltration or microfiltration.

BACKGROUND OF THE INVENTION

In the known processes of microfiltration and ultrafiltration, mainly tube- or plate-shaped membrane filtration modules are used. The liquid to be clarified or filtered flows crosswise to the filtration device over the membrane filtration surface. Thus, the clarified juice, the permeate, is separated from the liquid containing the filtration residues. This procedure is repeated from time to time in one circuit of the retentate. During batch processing the concentration of the filtration residues, the so-called proportion of solids, constantly increases.

The disadvantage of these known processes is that with increasing filtration time and increasing proportion of solids in the retentate, a decrease occurs in the filtration yield, e.g. the amount of permeate outflow per filtration surface unit and time unit. This decrease in the filtration yield can amount to less than half the starting value. For achieving a certain filtration yield, the reduced filtration yield must be taken into account in the design of ultrafiltration and microfiltration units. However, this requires large filtration surfaces and leads to expensive, partially uneconomical units with a large number of filtration modules.

SUMMARY OF THE INVENTION

The object of the invention is to avoid the disadvantages mentioned and to develop a process, which with reduced investment costs guarantees a high filtration yield.

This object is achieved according to the invention in that the proportion of solids in the retentate is sharply increased by concentrating during the starting time and after reaching the maximum filtration yield, is maintained constant by regulation. In this way the filtration yield, which at first decreases and then increases again when the proportion of solids increases further, can be maintained at a level far exceeding the starting value.

To ascertain the proportion of solids and to regulate the condition of the retentate, the proportion of solids or another quantity dependant on the proportion of solids is measured in the retentate circuit and the measured quantity is used to regulate the amount of retentate outflow or the amount of fresh juice to be fed in.

In another embodiment of the invention, the amount of permeate outflow or the filtration yield is measured to regulate the condition of the retentate and the measured quantity is used to regulate the amount of retentate outflow or the amount of fresh juice to be fed in. The measurement of proportion of solids can be omitted in this case, since the condition of the retentate is also largely dependant on the filtration yield.

Another embodiment of the invention provides for regulating the condition of the retentate in that both the proportion of solids or another quantity dependant on the proportion of solids and the amount of permeate outflow or the filtration yield are measured, and the desired value of the proportion of solids is determined by the maximum filtration yield value which can be achieved at the beginning of the process. The regulation of the condition of the retentate thus takes place depending on the proportion of solids, the desired value of which is not however pre-set as an empirical value, but rather is ascertained by ongoing measurement of the filtration yield.

To obtain the highest possible concentration of the proportion of solids in the retentate in the shortest possible time during the starting time, at first a relatively small amount of retentate is used and the remaining portion of the batch amount is fed to the retentate circuit only after achieving the desired value of the proportion of solids.

The unit for carrying out the process according to the invention is characterized in that, in the retentate circuit of an ultrafiltration or microfiltration device there is placed a measuring device to measure the proportion of solids and it is connected by a measurement line with a regulating device to regulate the condition of the retentate.

In another embodiment of the unit according to the invention, a measuring device is placed in the permeate outflow pipe of the ultrafiltration or microfiltration device to measure the amount of permeate outflow or the filtration yield and it is connected by a measurement line with the regulating device to regulate the condition of the retentate.

In another embodiment of the unit according to the invention, the measuring device for the filtration yield is provided in a supplementary manner as a measuring device for the proportion of solids, and the measuring devices are connected by measurement lines with the regulating device to regulate the condition of the retentate.

According to the invention the regulation of the condition of the retentate can take place by regulating the amount of the retentate outflow, and the regulating device is connected by a control line with a regulating valve, which is placed in a retentate outflow pipe branched off from the retentate circuit.

According to another feature of the invention the regulation of the condition of the retentate can take place by regulating the amount of fresh juice to be fed in, and the regulating device is connected by a control line with a regulating valve which is placed in a fresh juice feed pipe.

The advantages attained with the invention consist particularly in that by maintaining the proportion of solids in the retentate constantly at a certain value, very high filtration yield values are achieved. The number of filter modules can be reduced, since the savings in filtration surface amounts to about 50%. The makes possible the use of ultrafiltration or microfiltration units with high yield with small space requirements and reduced investment costs. In this way a high economical efficiency of the unit results. Also the starting filtration yield losses are significantly smaller in comparison to conventional processes, since with a small amount of retentate going up to a high concentration factor is performed in a short time. The circulating amounts are relatively small and short pipes can be used. The pressure and energy losses are likewise slight.

BRIEF DESCRIPTION OF THE DRAWINGS

The invention is explained in greater detail in the following drawings which represent several embodiments. There are shown in.

PREFERRED EMBODIMENTS OF THE INVENTION

Figure 1:
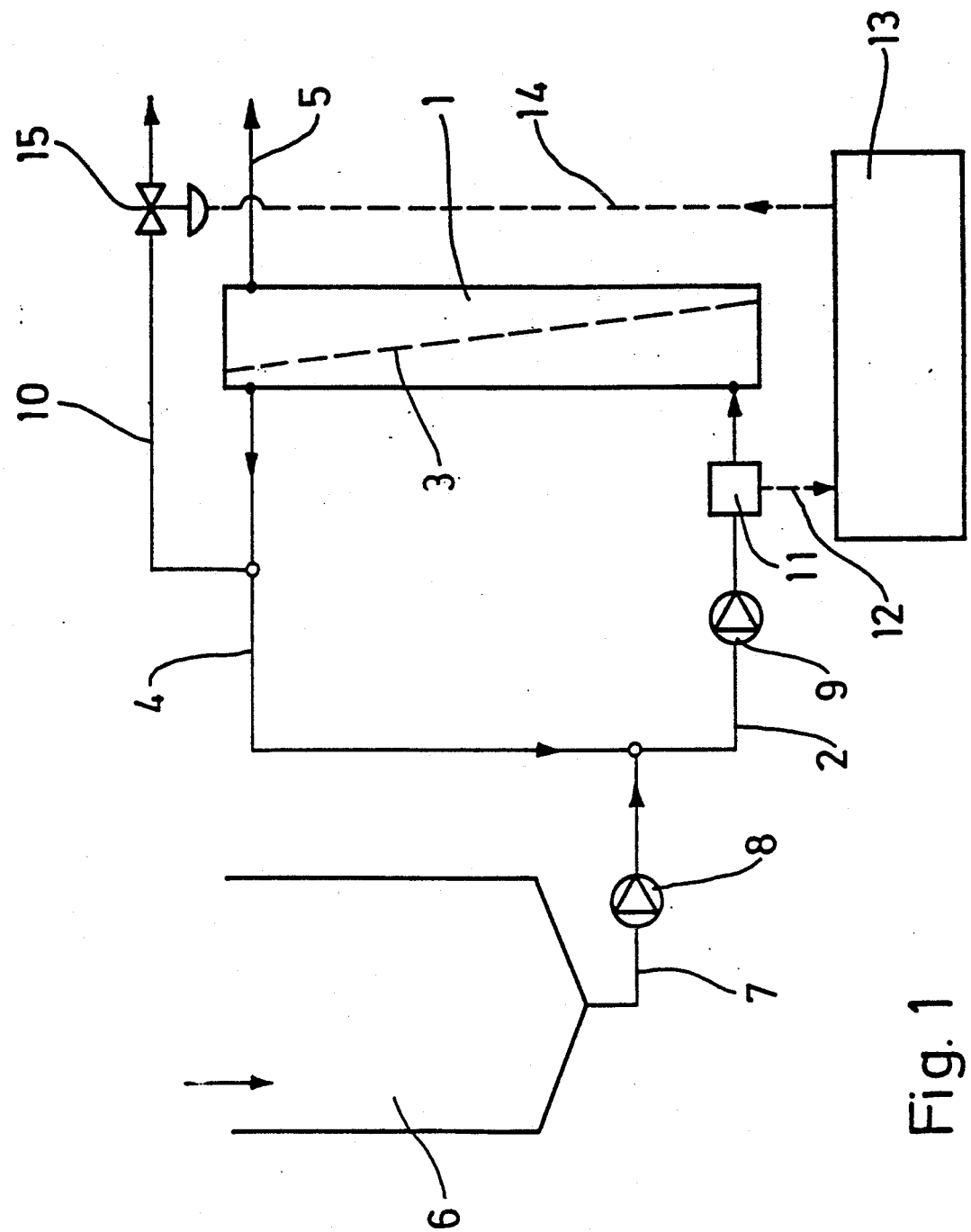
FIG. 1 a diagrammatic representation of the unit according to the invention, with proportion of solids as the measured quantity and amount of retentate outflow as the regulated quantity, FIG. 2 another embodiment of the unit according to the invention with proportion of solids as the measured quantity and the amount of fresh juice to be fed in as the regulated quantity and FIG. 3 another embodiment of the unit according to the invention with the amount of permeate outflow (filtration yield) as the measured quantity and the amount of retentate outflow as the regulated quantity.

The unit according to FIG. 1 consists of an ultrafiltration or microfiltration device 1 with a retentate circuit, which is formed by a feed pipe 2, a filter surface 3 on the retentate side and return pipe 4. On the permeate side of ultrafiltration or microfiltration device 1, the filtered clarified juice is removed by a permeate outflow pipe 5. The raw juice to be filtered is fed to the retentate circuit from a batch container 6 by a pipe 7. In pipe 7 there is placed a feed pump 8 and in feed pipe 2 of the retentate circuit there is placed a circulating pump 9. A retentate outflow pipe 10 branches off from return pipe 4 and leads to a collecting container for the retentate which is not represented.

In feed line 2 of the retentate circuit there is placed measuring device 11 by which the proportion of solids in the retentate is measured. The measured quantity ascertained is constantly transmitted to a regulating device 13 by a measurement line 12. From regulating device 13, a control line 14 leads to a regulating valve 15, which is placed in retentate outflow pipe 10.

At first only a small quantity of the raw juice to be filtered is introduced into batch container 6. The raw juice reaches the retentate circuit by pipe 7 and is carried, by circulating pump 9 in a circuit which is repeated from time to time, over filter surface 3 which separates the clear juice from the raw juice. With increasing concentration of the retentate, the filtration yield at first decreases to about half of the starting value and then increases again with further increase in the proportion of solids to a value which is far above the starting value. This significant improvement in the filtration yield which has ascertained by tests is to be attributed to the fact that with higher concentration of the proportion of solids in the retentate the flow behavior is altered. It is assumed that from a certain concentration of solids the flow goes from a Newtonian behavior to a kind of block flow. The flow boundary layer on the filter wall sharply increases in speed and decreases to a considerably smaller layer thickness. With this effect, fresh retentate reaches the filter surface considerably faster and causes an improved cleaning of the filtration layer by the proportion of solids in the retentate. In this way further deposits are prevented which could cause a reduction in filtration yield.

However, if the proportion of solids in the retentate increases even more, then only a slight further increase in filtration yield is achieved and with even further increase in the proportion of solids the circuit is interrupted as a result of too high a proportion of solids. The empirical value of the proportion of solids which was ascertained by tests and at which the filtration yield reaches its maximum is about 5% when dried, without water soluble portions, for apple juices. This or a value dependant on it is pre-set as the desired value in regulating device 13. By measuring device 11, the condition of the retentate or the proportion of solids in the retentate is ascertained, transmitted by measurement line 12 and compared with the pre-set desired value in regulating device 13. As soon as there is agreement, regulating valve 15 is opened by control line 14 and a regulated amount of retentate is removed by retentate outflow pipe 10 from the retentate circuit. At the same time as the opening of regulating valve 15 the remaining portion of the raw juice batch amount is fed into batch container 6, and with the help of feed pump 8, is fed to the retentate circuit as fresh juice. By further regulating the amount of the retentate outflow, the pre-set desired value of the proportion of solids and thereby the filtration yield is maintained constant.

As a result of the small starting amount of raw juice at the beginning of the process it is possible to achieve the concentration of the retentate corresponding to the pre-set desired value of the proportion of solids and thereby the maximum filtration yield in the shortest time possible. This period is between approximately 8 and 20 minutes depending on the quantity of the different influencing factors.

Instead of the proportion of solids, another quantity dependant on the proportion of solids, such as e.g. cloudiness, viscosity, specific density, pressure, temperature or the flow profile of the retentate can be measured with measuring device 11. Thus several measured quantities can also be used to ascertain the condition of the retentate.

Figure 2:
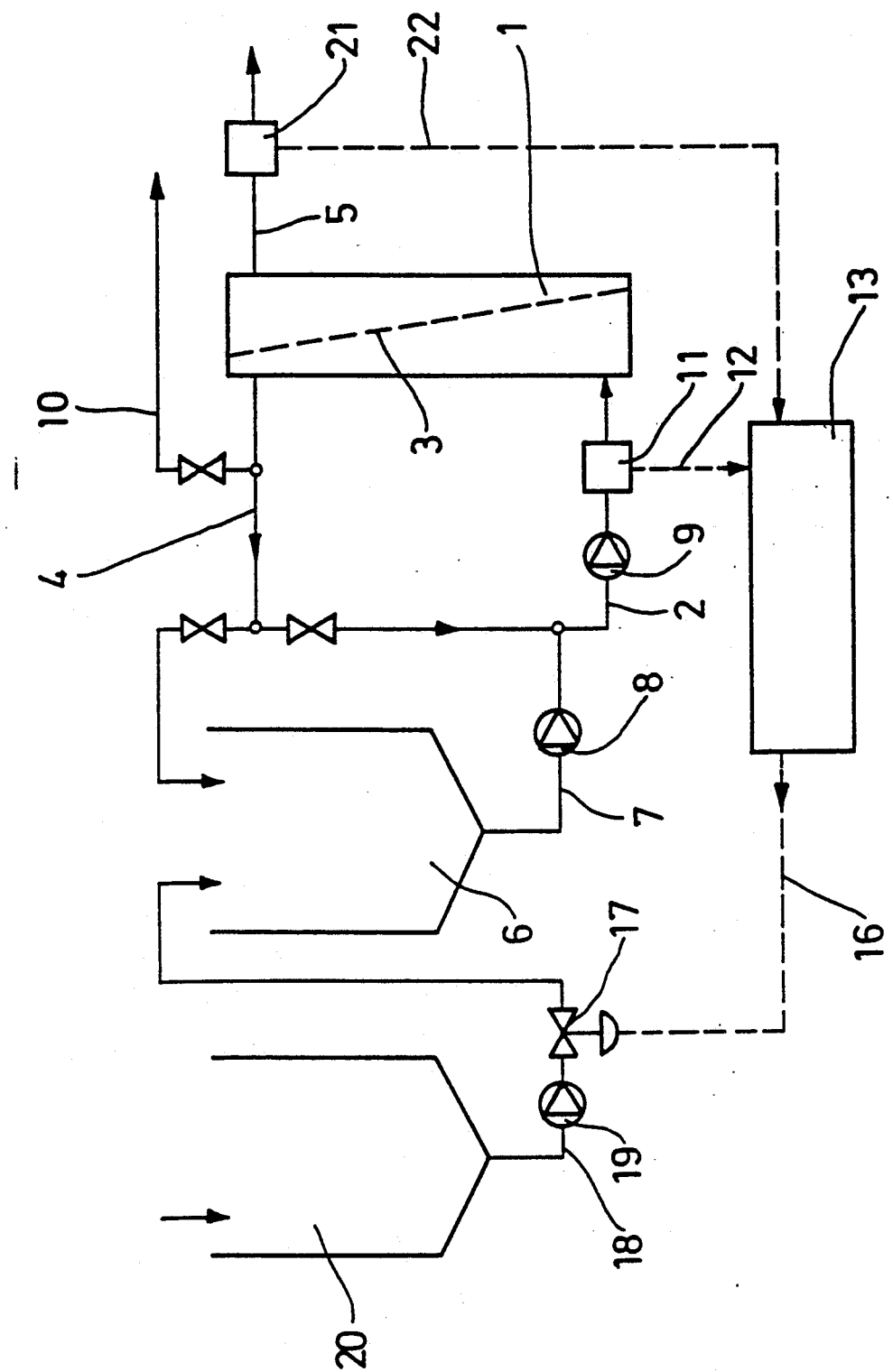

Another embodiment of the invention is represented in FIG. 2. Here the amount of retentate circulated is greater in comparison to the embodiment according to FIG. 1. This makes possible a somewhat slower regulating circuit. Regulating the condition of the retentate or maintaining the proportion of solids constant takes place in this embodiment not by the amount of retentate outflow, but rather by the amount of fresh juice to be fed in. From regulating device 13 a control line 16 leads to a regulating valve 17, which is placed in a fresh juice feed pipe 18. Fresh juice feed pipe 18, in which a circulating pump 19 is placed, leads from a fresh juice container 20 to batch container 6. At the beginning of the process the proportion of solids in the retentate is driven up sharply as in the embodiment according to FIG. 1 and is measured with the help of measuring device 11 in retentate circuit 2, 3, 4. At the same time the flowthrough amount of the permeate, which corresponds to the filtration yield, is measured with additional measuring device 21 placed in permeate outflow pipe 5. The measured quantity is transmitted to regulating device 13 by measurement line 22. The regulating of the proportion of solids thus takes place not as in the embodiment according FIG. 1 by a pre-set empirical value, but rather by observation of the course of the filtration yield at the beginning of the process. As soon as the maximum possible filtration yield is achieved or the increase in filtration yield diminishes, the proportion of solids in the retentate achieved up to this point in time is maintained constant. For this purpose, regulating valve 17 is opened by regulating device 13 by control line 16, so that fresh juice from container 20 can reach batch container 6 and from there retentate circuit 2, 3, 4 by pipe 7. Maintaining constant the proportion of solids over the entire duration of the process then takes place again by measuring device 11, which constantly transmits the measured proportion of solids to regulating device 13.

Figure 3:
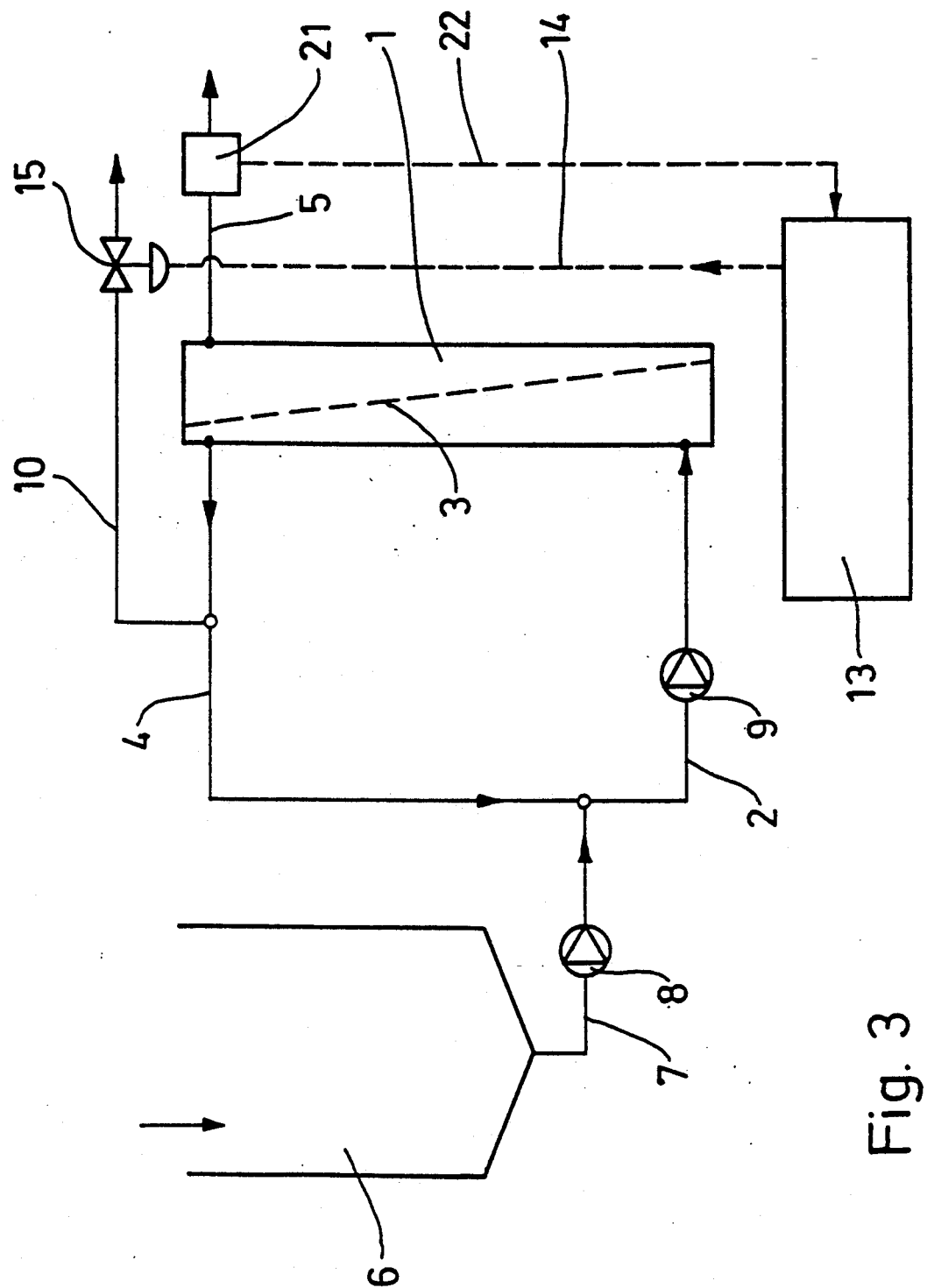

It is nevertheless possible to perform regulation of the proportion of solids in the retentate directly by the filtration yield, which depends to a large extent on the condition of the retentate, without measuring the proportion of solids. As FIG. 3 shows, in this case measuring device 11 in retentate circuit 2, 3, 4 is omitted. In measuring device 21, which is placed in permeate outflow pipe 5, the filtration yield is constantly measured right from the beginning and the measured quantity is fed into regulating device 13 by measurement line 22. At the beginning of the process the unit is driven up to an increased filtration yield value. As soon as the maximum possible filtration yield is achieved or the increase in filtration yield diminishes, regulating valve 15 is opened by control line 14 and the filtration yield or the proportion of solids in the retentate is maintained constant by regulated retentate removal over the entire duration of the process. Instead of removing the retentate, the regulation can also take place by feeding in fresh juice as in the embodiment according to FIG. 2.

I claim:

1. A process for clarifying liquids, particularly raw juice from grapes, berries or other fruits and vegetables by ultrafiltration or microfiltration comprising the steps of subjecting a raw juice to one of an ultrafiltration or microfiltration to obtain an initial filtration yield of permeate of a clear juice and a retentate having solids therein, continuing to subject the retentate to the ultrafiltration or microfiltration while introducing a small quantity of raw juice into the retentate to increase sharply the proportion of solids in the retentate whereupon the filtration yield at first decreases and then increases with a continued increase in the proportion of solids, ascertaining the maximum filtration yield of permeate occurring during the increasing of the proportion of solids in the retentate, and maintaining constant the proportion of solids at which the maximum filtration yield occurs such that the maximum filtration yield remains constant.

2. A process as claimed in claim 1 and the steps of measuring the proportion of solids in the retentate or another property of the retentate dependent on the proportion of solids therein, and regulating an amount of retentate outflow or the amount of supplied raw juice in response to the measured proportion or property.

3. A process as claimed in claim 1 and the steps of measuring an amount of permeate outflow or filtration yield, and regulating an amount of retentate outflow or the amount of supplied raw juice in response to the measured permeate outflow or filtration yield.

4. A process as claimed in claim 1 and the steps of measuring the proportion of solids in the retentate or another property of the retentate dependent on the proportion of solids therein, measuring an amount of permeate outflow or filtration yield, and determining the proportion of solids occurring at a maximum filtration yield achieved at the beginning of the process.

5. A process as claimed in claim 1 and the steps of utilizing only a relatively small amount of retentate during the starting of the process, and feeding a remaining portion of a batch of raw juice into the retentate circuit only after a predetermined proportion of solids in the retentate is attained.

* * * * *